United States Patent
Obrador et al.

(10) Patent No.: US 7,908,558 B2
(45) Date of Patent: Mar. 15, 2011

(54) METHOD AND SYSTEM FOR AUTOMATICALLY SELECTING IMAGES FROM AMONG MULTIPLE IMAGES

(75) Inventors: Pere Obrador, Mountain View, CA (US); Ullas Gargi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 998 days.

(21) Appl. No.: 11/127,079

(22) Filed: May 12, 2005

(65) Prior Publication Data

US 2006/0259863 A1    Nov. 16, 2006

(51) Int. Cl.
  *G06F 3/00* (2006.01)
  *G06K 9/00* (2006.01)
(52) U.S. Cl. ........ 715/730; 715/731; 715/732; 382/168; 382/170; 382/172
(58) Field of Classification Search .................. 715/730, 715/731, 732; 707/6; 382/168, 170, 172
See application file for complete search history.

(56) References Cited

U.S. PATENT DOCUMENTS

| | | | | |
|---|---|---|---|---|
| 5,574,798 | A * | 11/1996 | Greer et al. | 382/100 |
| 6,606,411 | B1 * | 8/2003 | Loui et al. | 382/224 |
| 7,016,540 | B1 * | 3/2006 | Gong et al. | 382/225 |
| 7,216,295 | B2 * | 5/2007 | Wu et al. | 715/203 |
| 2003/0068100 | A1 * | 4/2003 | Covell et al. | 382/305 |
| 2003/0084065 | A1 * | 5/2003 | Lin et al. | 707/104.1 |
| 2004/0019608 | A1 * | 1/2004 | Obrador | 707/104.1 |
| 2006/0239557 | A1 * | 10/2006 | Cahill et al. | 382/181 |
| 2006/0253783 | A1 * | 11/2006 | Vronay et al. | 715/730 |

* cited by examiner

*Primary Examiner* — Dennis-Doon Chow
*Assistant Examiner* — Grant D Johnson

(57) ABSTRACT

Exemplary embodiments of the present invention are directed to a method for automatically selecting images, from among multiple images, for sequential display, comprising: establishing a total time for a sequential display of a set of selected images; clustering images into groups; ordering the images based on image quality; and selecting at least one of the images within a selected group based on the image quality and total time for inclusion in the set of selected images.

33 Claims, 6 Drawing Sheets

METHOD AND SYSTEM FOR AUTOMATICALLY SELECTING IMAGES FROM AMONG MULTIPLE IMAGES

BACKGROUND

The present invention relates to image processing to produce a sequential display of selected images from database.

Known systems for automatic image classification have been applied to multiple images stored in a database. The classification has been used to index images so that the images can be categorized, browsed, and retrieved. Images have been stored in the database with descriptive information regarding the image file, such as the file creation date, file name, file extension and the like. Techniques used for image classification are, for the most part, similar to classification techniques applied to any form of digital information.

An exemplary image classification technique provides for navigation through a collection of images to facilitate image retrieval. The appearance of an image is summarized by distribution of color or texture features, and a metric is defined between any two such distributions. A measure of perceptual dissimilarity is provided to assist in image retrieval. Two or three-dimensional Euclidean space has been used to evaluate differences in distances between images to highlight image dissimilarities. The results can be used to assist in a database query for locating a particular image.

SUMMARY OF THE INVENTION

Exemplary embodiments of the present invention are directed to a method for automatically selecting images, from among multiple images, for sequential display, comprising: establishing a total time for a sequential display of a set of selected images; clustering images into groups; ordering the images based on image quality; and selecting at least one of the images within a selected group based on the image quality and total time for inclusion in the set of selected images.

An exemplary system for performing such a method for automatically selecting images, from among multiple images, for sequential display, comprises: a memory for storing multiple images; and a processor for clustering images into groups, for ordering the images based on image quality, and for selecting at least one of the images within a selected group based on the image quality and a total time established for a sequential display of a set of selected images.

BRIEF DESCRIPTION OF THE DRAWING FIGURES

The Figures illustrate exemplary concepts and embodiments of methods and systems for automatic video editing as disclosed, wherein.

DETAILED DESCRIPTION

Figure 1:
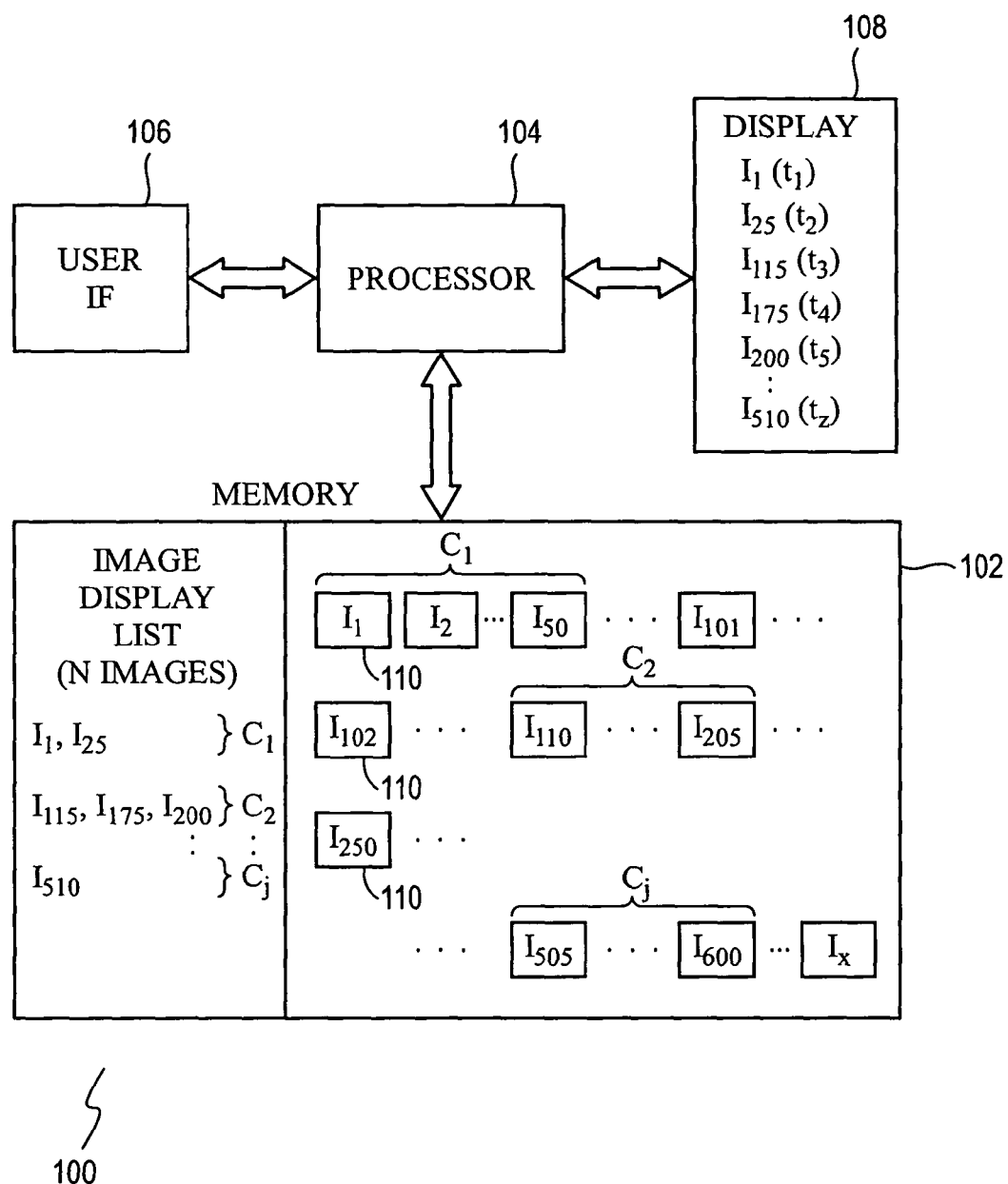
FIG. 1 illustrates an exemplary system for automatically selecting images.

FIG. 1 illustrates an exemplary system 100 for automatically selecting images (I), from among multiple images ($I_X$), for sequential display. The FIG. 1 system includes a memory, such as memory 102, for storing multiple images $I_X$. For convenience, each of the images ($I_x$) in the memory 102 is labeled 110. The memory can include multiple memories which can be co-located, or which can be distributed among multiple locations. The memory can be configured to include any desired information including, but not limited to, an image display list which identifies the total number of images N of all of the images $I_X$, to be used for the sequential display.

The FIG. 1 system 100 includes a processor 104 for automatically clustering images into time based groups, referenced herein as clusters Cj. In an exemplary embodiment, the groups can be time-based groups (e.g., images are clustered based on a temporal characteristic). However, any known criteria can be used for the clustering including, but not limited to, use of geophysical information associated with an image or images (e.g., a Global Positioning System (GPS) stamp associated with each image). The processor performs clustering as a part of its programming, and in accordance with the flow chart of FIG. 2.

In addition to clustering images, the processor is provided for ordering the images $I_X$ based on image quality (Q) (where quality also includes overall merit of an image). For example, the images can be ordered by establishing a list of images (e.g., from best to worst based on assessed quality). The list can, for example, be scalable such that selecting the first N photographs will result in the N-best quality photographs being selected. The image processor can select at least one of the images within a selected group based on the image quality and a total time (T) established for a sequential display of set of selected images.

The processor can also store in the memory an indication of each image contained within the set of selected images. In the exemplary FIG. 1 memory 102, the indications are stored as part of an image display list already mentioned, wherein images selected from various clusters Cj are stored, or an identifier for each such image is stored. As those skilled in the art will appreciate, the image display list need not be stored as part of the memory 102, but can be stored in a separate location, and can include any information which will allow the processor to retrieve, for sequential display, the selected images. For example, in an alternate embodiment, the selected images can be stored within a local memory of the processor 104 for sequential display, or a portion of the images can be stored therein.

The FIG. 1 system 100 includes a user interface, such as interface 106, for establishing a total time for sequential display of the set of selected images. The total time can, for example, be established by setting a total time within which images to be selected can be displayed. Alternately, the total time can be established by, for example, any other suitable information including, without limitation, specifying a total number of images, and a specific time within which each such image must be selected.

The user interface can, for example, be any input device including, without limitation, a keyboard, a mouse, or other device. The user interface can be alternately configured as, or operate in conjunction with, a display 108. Where the display 108 forms a part of the user interface it can be configured as the interface 600 shown in FIG. 6 to display the range of images (e.g., photographic images) within each cluster, and associated image information (such as time-based information, geophysical information, or other desired information). Any number of soft buttons and data entry areas can be included.

Figure 6:
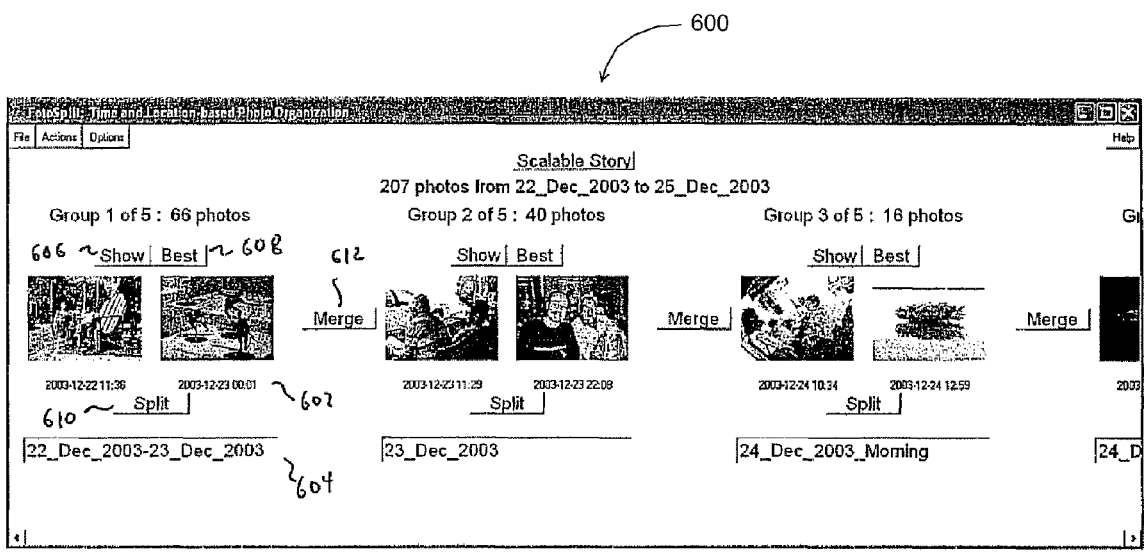
FIG. 6 illustrates features of an exemplary portion of a user interface presented on a display.

In the FIG. 6 example, a user can view time-based information 602, can alter the time range via data entry areas 604, can activate buttons 606 or 608 to view all images of a group ("show") or only a specified number of the best quality images within a group ("best'). "Split" and "merge" buttons 610, 612 can be used to, for example, split or merge images in various clusters as desired.

The display 108 of the FIG. 1 system 100 can be used for displaying a set of selected images, under control of the processor 104, within a specified sequence and within a total time period to, for example, provide a scalable story or N images. The specified sequence is a sequence which allows, in an exemplary embodiment, a story to be described via the order in which the selected images are sequentially displayed.

In an exemplary embodiment, the system will generate a slide show of pictures which best reflect the entire sequence of events covered by all of the images $I_X$, within a specified total time allowed. For example, if the memory 102 includes 1000 images, each of which are to be displayed for 20 seconds, the total time would be 20,000 seconds from which the entire slide show must be completed. However, by selecting (e.g., scalably selecting) preferred images from the collection of images stored within the memory 102, N images which fill the allotted time for the slide show can be intelligently selected such that regardless of the total time allocated, a reasonable understanding of all events covered by the images can be realized. Once a set of images has been selected using a manual and/or an automatic selection process in accordance with exemplary embodiments described herein, a user can alter the overall amount of time and/or an average time that each image is to be displayed within the slide show. Any resultant sequential display will include an appropriate number of images, which accurately reflect the events which occurred, and would be represented on the display 108.

Figure 2:
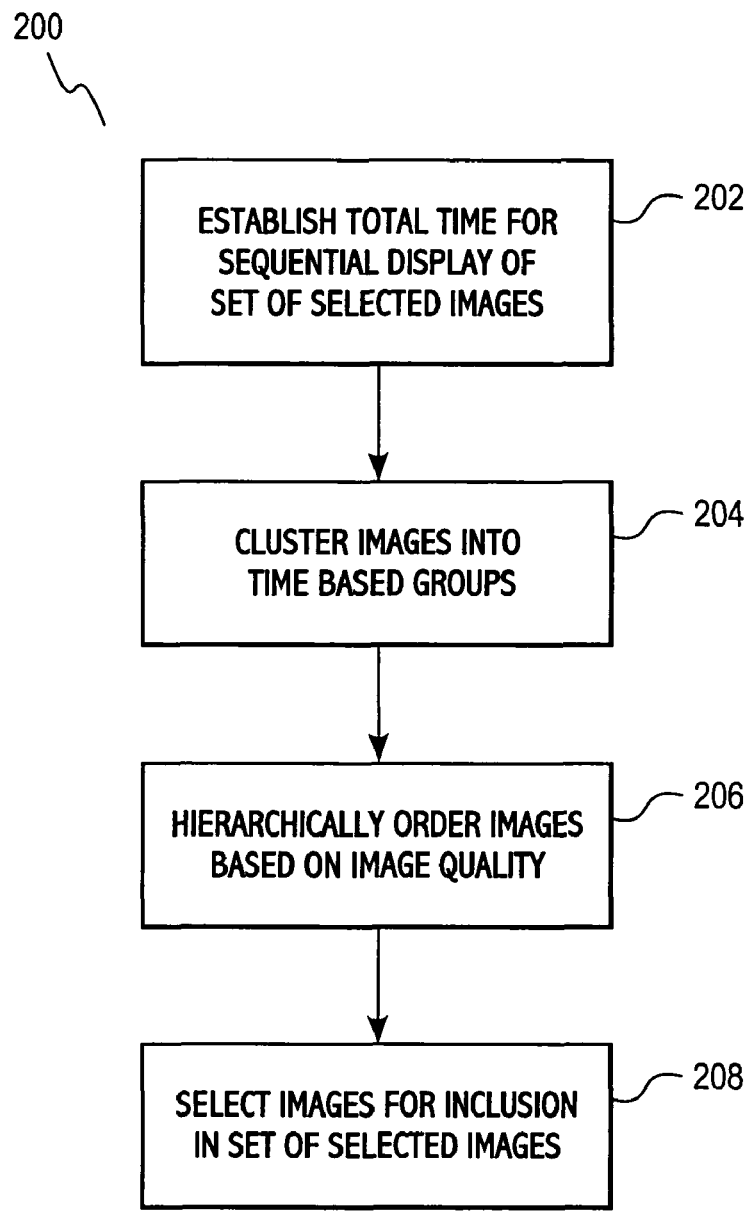
FIG. 2 illustrates a flow chart of an exemplary process performed by the FIG. 1 processor.

The manner by which N images are selected in accordance with exemplary embodiments described herein, will be described in conjunction with the flowchart of FIG. 2. The flowchart of FIG. 2 represents functional characteristics of programming code implemented by processor 104. The programming code can be stored within processor 104, or can be stored on a computer readable medium that can be accessed by processor 104, or any desired computer.

Referring to the FIG. 2 flowchart 200, the steps of which can be performed in any desired sequence and not necessarily in the order shown, a first illustrated block 202 establishes a total time for sequential display of a set of N selected images. As already mentioned, the total number of images N, in conjunction with a specific display time for each selected image, can be used to set the total time. Alternately, the user can set a total time for displaying a set number of images.

In block 204, the images contained in the memory 102 (i.e., all of the images $I_1$-$I_X$) are clustered into groups, or clusters $C_j$. The clustering can, for example, be performed in any known fashion, including, but not limited to, using a time stamp and/or geophysical stamp or other information associated with each of the multiple images contained in the memory 102.

In block 206, the images within a selected group are ordered based on image quality (Q). In an exemplary embodiment, all of the images in the memory 102 (i.e., images $I_1$-$I_X$) are ordered in a list, which can be established as a scalable list of the images. However, those skilled in the art will appreciate that the images in any or all of the groups $C_j$ can be ordered as desired. The ordering of images can be based on image quality using objective criteria, or can be based on subjected criteria established by a user via, for example, user interface 106 (e.g., preferences of the user to include images having human faces therein). The order, such as the ordered, scalable list, can be established by assigning a quality number to each image within at least one of the groups. However, as already mentioned, such a quality number is assigned to all of the images which are to be ordered (i.e., images $I_1$-$I_X$).

Where image quality (Q) is determined using objective criteria, characteristics such as image focus, image lighting characteristics and/or image color can be used. Of course, any other characteristic desired can be used to affect the image quality number assigned to the images.

The selection of the specific images for inclusion in this sequential display will now be described in greater detail. The selecting of the image is performed as a function of a characteristic of a group $C_j$. For example, an image can be selected as a function of a characteristic representing a temporal extent factor (TE) of a time-based group, and as a function of a number of images already selected from the time-based group under consideration. In an exemplary embodiment, a minimum number of the best quality images can be selected from each group. Afterwards, the following function (equation) can be used to select an image for each image selection step k:

$$F_{Merit}[I_i]_{Step\,k} = \left(1 + \frac{\text{Temporal Extent}(Cj)}{F_{RC}(C_j, k, I_i)}\right) \cdot \frac{Q(I_i)}{F_{sel}(C_j)}$$

Alternately, the foregoing function can be used to select all N images. A maximum number of images selectable from each group can, if desired, also be specified.

In the foregoing equation, $F_{Merit}$ constitutes a merit factor for use in selecting a particular image $I_i$ at a given step k in the image selecting process. At each incremental step k, a merit factor is assigned to the best quality image in each group. An image $I_i$ is then selected from among all images of the clusters, and this process is repeated until the total number of images N has been selected.

In the foregoing equation, an image is selected, as already mentioned, as a function of a characteristic representing a temporal extent (TE) of a group. The selection of a value for the temporal extent will be discussed with respect to FIG. 3, wherein an exemplary graph is shown. The value for TE is a scalar value selected as a function of the size of the cluster $C_j$ under consideration. Thus curve will change for each cluster.

Figure 3:
FIG. 3 shows an exemplary graph for selecting a temporal extent (TE) based on a cluster size of a time based cluster Cj; TE=Temporal Extent Factor; temporal extent is the extent of the cluster itself, so what the function shows is the factor that we'll use based on the temporal extent itself.

For the cluster $C_j$ shown in FIG. 3, the value selected as the TE factor is 0 for a cluster $C_j$ of limited size in time. For example, a cluster has some images (e.g., spanning a relatively short time frame) from among several thousand images in the memory, the size and time of the cluster would be considered relatively low (i.e., toward the left hand side of the X-axis in FIG. 3). For such a cluster of limited size, the temporal extent factor (TE) would be selected as 0. Above clusters of a given size in time, a maximum value for TE would be assigned (e.g., a relatively high constant A). In a transition period, the value for TE could be varied in accordance with the slope of the curve shown in FIG. 3. Thus, depending on the size and time of a given time-based group or cluster $C_j$, a value for the temporal extent will be selected. Those skilled in the art will appreciate that the curve illustrated in FIG. 3 can be modified in any suitable manner desired by a user. The value selected constitutes the numerator for the temporal extent in the above equation.

As already mentioned, an image can also be selected as a function of a number of images already selected from a given time-based group $C_j$. This is reflected in the denominator of the first fractional component in the above equation, labeled $F_{RC}$, representing the factor for relative coverage of images within a given cluster. The manner by which a value is determined as a relative coverage of images within a time-based group, will be described with respect to the graphs of FIGS. 4A-4C. Referring to these graphs, the value can be seen to be determined, in an exemplary embodiment, as a function of a temporal characteristic of images already selected from the time-based group and a time-based histogram of images contained in the time-based group.

Figure 4A:
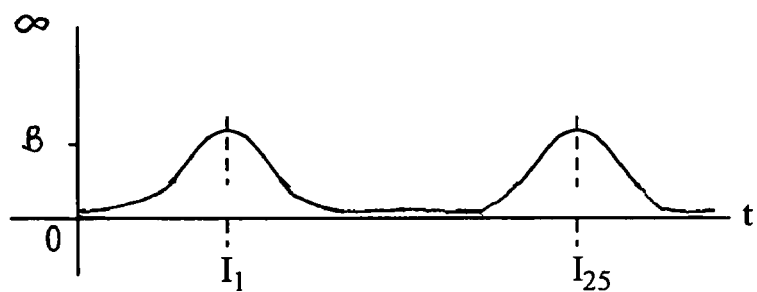
FIGS. 4A-4C illustrate graphs for determining a value for a relative coverage factor $F_{RC}$ as a function of the cluster Cj and a step k in the image selection process used to select an image $I_i$.

Referring to FIG. 4A, for a given cluster $C_j$, two images $I_1$ and $I_{25}$ have been selected, and represented as delta values. The delta values can be spikes with a magnitude of a sufficiently high magnitude 8, such as magnitude approaching infinity, so that for example, A (FIG. 3) divided by the maximum $F_{RC}$ tends to zero. A floor of the FIG. 4A function is not, in an exemplary embodiment, zero such that A (FIG. 3) divided by a minimum $F_{RC}$ provides what the user deems to be a reasonable increment of the $F_{merit}$. These two spikes are convolved with a Gaussian function to spread the impulse over a desired time width. The extent of this time width can be optional, and where used, can be set to any desired width deemed suitable. The result is the Gaussian curve shown in FIG. 4A for each of the two images $I_1$ and $I_{25}$ for the given cluster under consideration. In an exemplary embodiment, the height of the Gaussian curve can be selected such that the function in the foregoing equation goes to zero when close to the peak of the Gaussian.

Figure 4B:
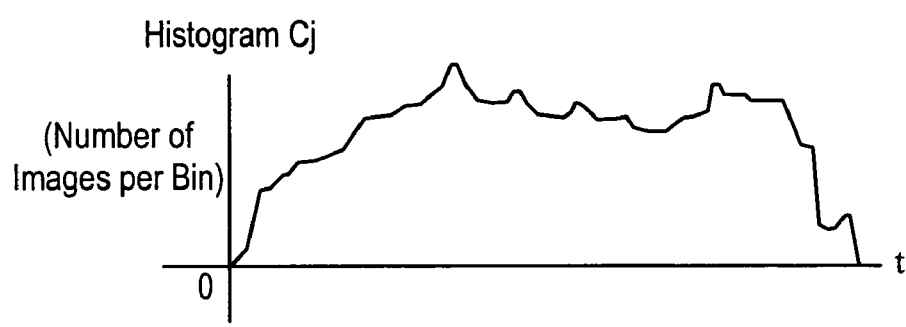

FIG. 4B illustrates a histogram that represents the images within a given cluster $C_j$, which have been placed into time-based bins. For example, each image can be allocated to a bin depending on the time stamp within which the image was acquired. The bins can be set to encompass any desired time width (e.g., 30 minute intervals). Thus, any images which occurred within each 30 minute interval will be used to increment a counter of an appropriate bin. The total count for each time interval constitutes a point in the FIG. 4B graph.

Figure 4C:
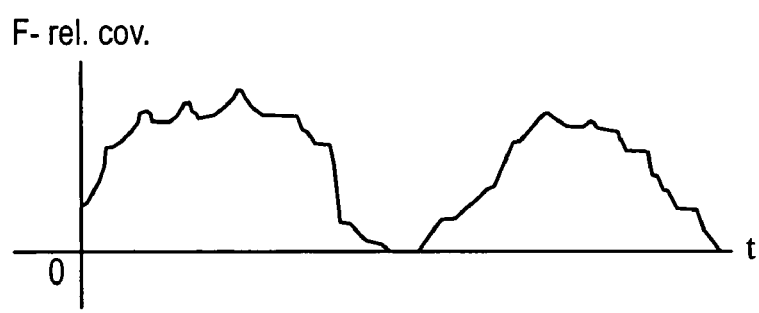

The exemplary graph used to produce the relative coverage factor $F_{RC}$ is shown in FIG. 4C. This graph is produced by dividing the graph of FIG. 4A by the values of FIG. 4B. The values in each of the graphs 4A-4C will, of course, change with each step k. For example, if another image is selected from the cluster $C_j$, then another image should be added to the FIG. 4A graph which will, in turn, influence the graph shown in FIG. 4C.

The $F_{RC}$ value selected off the Y-axis of the graph of FIG. 4C, is selected as a function of the image $I_1$ currently being considered in the given cluster for inclusion in the set of selected images. In an exemplary embodiment, a candidate image $I_i$ can be selected from each cluster $C_j$ and assigned a merit factor $F_{merit}$ in accordance with the aforementioned formula. The candidate image having the highest $F_{merit}$ will be selected for the given step k. This process can be repeated until the total number of images N has been elected for the sequential display.

The rightmost portion of the formula $F_{merit}$ includes, as a numerator, a quality number for the candidate image $I_i$ under consideration from a given cluster. As already mentioned, this quality number can be assigned to the image in advance as a function of objective criteria and/or as a function of subjective criteria of the user.

As referenced herein, an "image" is any image or electronic data file that is stored in electronic form in any type of electronic storage medium or computer memory. An image can be any digital image captured from any type of digital capturing device such as, without limitation, digital video cameras, digital cameras, video capture cards or any other imaging capturing device. An image can alternately be an analog image captured from, for example, any camera, video camera or analog image capture source or device, that are scanned or otherwise digitized and stored as a digital image. An image can also be an electronic document such as, for example, a multimedia document that contains images, video, sound and so forth. Those skilled in the art will recognize that the image can be any type of electronic file that a user can access from a collection of electronic data file.

A time-based group, or cluster, is a subset of the entire collection of images contained in the memory, in which the images in the time-based cluster are related by any parameter or parameters. In an exemplary embodiment, the images in a time-based cluster can be related in time, such as for example, the capture time in the images, the access time of the images, the time the images were digitized, or any other type of relationship of the images. The images in a time-based cluster can be from a certain time period, and/or the images can relate to a certain event and/or the images can possess a common geophysical location. Those skilled in the art will recognize that the images in a cluster can be related in any manner to form a cluster from which a sequence of events can be evaluated.

The quality number for each image can be assigned in any known manner. In an exemplary embodiment, a weighted quality metric can be used to assign each image the quality number as a function of an image analysis heuristic. The weighted quality metric can be any value, parameter, feature or characteristic that is a measure of the quality of an image from the perspective of the user, and/or is based on objective criteria. For example, the weighted quality measure can indicate the meaningfulness or significance of the image to be used. Using a weighted quality metric, a determination can be made, for example, which images that the user considers most preferred, e.g., images having the most personal meaning, significance, and/or interest to the user. Alternately, the quality metric can indicate, for example, characteristics or features of an image such as color, brightness, contrast, number of faces contained in the image, or any other characteristic or feature of the image.

The quality number can be any value, as long as the value reflects the quality of an image from the perspective of the user based on the weighted quality metric. An image that has great meaning or significance to a user (e.g., has a high quality to the user) can have a heavily weighted quality metric and a large quality number). An image having little or no meaning or significance to the user can have a lightly weighted quality metric, and a small or zero quality number. Alternately, or in addition, an image having objective characteristics deemed desirable, such as high contrast, colorful, high brightness or any faces, can have a heavily weighted quality metric and a large quality number. An image having characteristics deemed less desirable, such as little or no contrast, color, or brightness, or few faces, and have a lightly weighted quality metric and a small or zero quality number.

Exemplary methods for determining characteristics of an image include, for example, without limitations, determining brightness of an image in a manner as described in U.S. Pat. No. 4,731,865, determining contrast of an image in a manner as described in U.S. Pat. No. 5,642,433, determining color in an image in a manner as described in U.S. Pat. No. 4,488,245 and/or face detection in a manner as described in U.S. Pat. No. 5,642,431. However, those skilled in the art will appreciate that any available methods can be used to determine weighted quality metric for assigning a quality number to an image. Quality numbers can, for example, be assigned in a manner as described in commonly assigned co-pending application Ser. No. 09/984,810 entitled "Method And System For Accessing Collection Of Images In A Database", filed Oct. 31, 2001.

The quality (Q) of an image $I_i$ is divided, in the aforementioned formula, by a value which is a function of a percentage of images already selected from the group under consideration. In the denominator of the formula, a value representing a factor of selection $F_{SEL}$ is based on the cluster under consideration, and the current step k in the process of selecting the N images. The manner by which the value for the factor $F_{SEL}$ is selected will be described with respect to FIG. 5.

Figure 5:
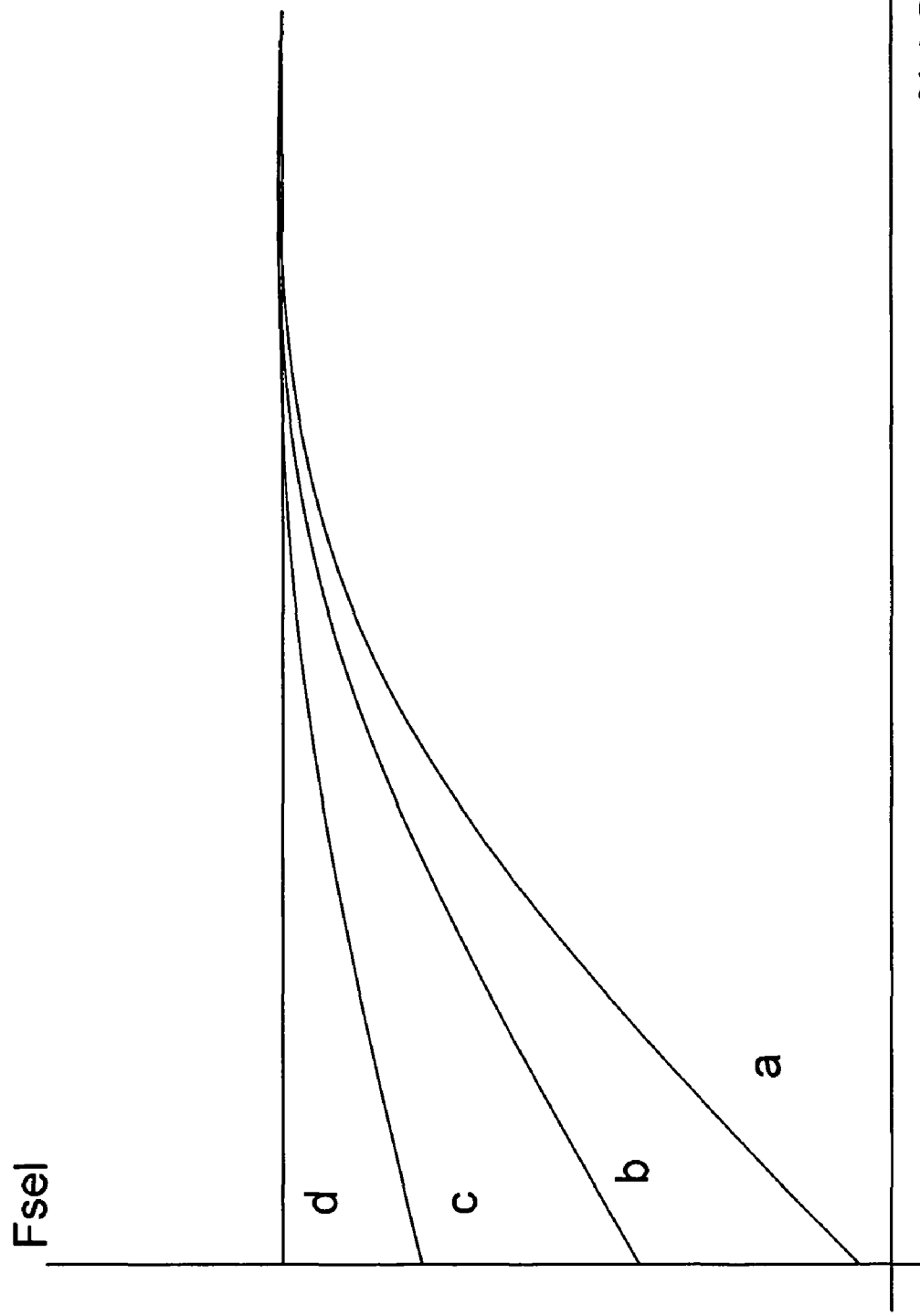
FIG. 5 illustrates an exemplary graph for use in selecting a value of a select factor $F_{SEL}$ as a function of the cluster and percentage of images selected within that cluster.

FIG. 5 illustrates a graph for a given cluster, and the curve in this graph can change depending on the quality of images (e.g., average quality) of images contained within the given cluster. For example, where all of the images in the cluster are relatively high quality, all have high quality numbers, the curve may appear as a relatively straight line "d" extending from an exemplary y-value of 1.0 on the Y-axis. In contrast, for a time-based group having images which are all relatively low quality, the curve "a" may result, which intersects a low value of the Y-axis increasing up to 1.0 for a certain value of x (percentage of images already selected from this cluster). Group of images, which include a mix of high and low quality of images (based on the average quality of the cluster, relative to the average quality of other clusters) can have "b" or "c" curves as shown in FIG. 5. For the exemplary curves "a" through "c", when a relatively low percentage of images have been selected from a given group, the value for $F_{sel}$ will be relatively low (e.g., near zero). However, as the percentage of images selected from a given group increases, the value $F_{sel}$ will increase.

In the exemplary FIG. 5 graph, where fifty percent, or any other desired percent (e.g., 75 percent) images have been selected from a given cluster, the value for $F_{sel}$ has been selected as a maximum value of 1.0. However, any x-value can be selected as the percentage which will result in a maximum value for $F_{SEL}$ without regard to image quality. The effect of selecting a value $F_{sel}$ in this manner, is that the value $F_{sel}$ will rise as more and more images are selected from a given cluster. This in turn will lower the merit of image $I_i$ under consideration in that group. When the image $I_i$ in a given group has its quality number reduced via an increased $F_{sel}$, an image of lesser quality in a different time-based cluster, where perhaps a much lower number of images is selected, will achieve a higher merit factor $F_{merit}$.

Thus, applying the above equation to each image under consideration in each time-based group will result in selection of an image from a particular group which may not otherwise have been selected. Exemplary embodiments can ensure that a somewhat inferior image, which is important to preserving a sequence of events captured by all of the images $I_i$-$I_x$ will be preserved in a sequential display of the N images. The select factor $F_{sel}$ can thus boost the quality number (Q) for a given image within a given cluster to favor selection of that image. The favoring of images in groups with lower quality can ensure they are involved the collection of images used to capture an effective storytelling of events associated with the images, without regard to the number of images selected for inclusion in a slideshow.

In an exemplary embodiment, the FIG. 5 graph can be mathematically described. For example, a value of $F_{sel}$ can be selected closer to zero (0.001) when the number of images differ from a given group below a specified minimum. Once the minimum number of images has been selected from each group, the graph used to calculate a value for the select factor $F_{SEL}$. The slope of the appropriate curve in FIG. 5 can be multiplied by the percentage of images selected to arrive at a value for $F_{sel}$. Such an implementation would, as those skilled in the art will recognize, constitute a linear equation, as opposed to the nonlinear curve illustrated in FIG. 5. However, those skilled in the art will appreciate that any desired curve, linear or otherwise, can be used to correlate the percentage of images selected along the X-axis in FIG. 5 with a desired select factor $F_{sel}$.

In accordance with exemplary embodiments, a minimum number of images can be selected from each time-based cluster (e.g., one, two or any other specified number) regardless of relative quality among the time-based groups). For example, two best quality images from each time-based group can be selected. Afterwards, the aforementioned formula can be used to select additional images from the various time-based clusters until the total number of images N is achieved. A maximum number of mages selected from any cluster can also be optionally established.

Ideally, the images will be selected from the groups in such a manner that the set of selected images will accurately reflect all events captured by all of the images. For example, where all of the images $I_i$-$I_x$ constitute various cities visited during an excursion to Europe, with each time-based group corresponding to the images captured within each day of the trip (where each day may have spanned multiple cities), the set of selected images would include images from each attraction visited within each city of the trip.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. Method for automatically selecting images, from among multiple images, for sequential display, comprising:
    establishing a total time for a sequential display of a set of selected images;
    clustering images into groups;
    ordering the images based on image quality; and
    selecting at least one image within a group, based on a function of a characteristic of the image quality of the image divided by a value which is a function of a percentage of images already selected from the group, and based on the total time, for inclusion in the set of selected images.

2. Method according to claim 1, comprising:
    selecting the at least one image based also on a function of a characteristic of a group.

3. Method according to claim 2, wherein the characteristic of a group represents a temporal extent of the group, the method further comprising:
    selecting the at least one image based also on a function of a number of images already selected from the group.

4. Method according to claim 3, wherein the selecting is performed based also on dividing a value which is a function of the temporal extent by a value which is a function of the number of images already selected from the group.

5. Method according to claim 4, wherein the value which is a function of the number of images already selected from the group is determined as a relative coverage of images within the group, the relative coverage being determined as a function of a temporal characteristic of images already selected from the group, divided by a histogram of images contained within the group.

6. Method according to claim 1, comprising:
establishing a display time with which each selected image will be displayed within the sequential display, and selecting a total number of N of images to be included within the set of selected images.

7. Method according to claim 1, comprising:
continuing the selecting of images until a total number of N images has been selected for inclusion within the set of selected images.

8. Method according to claim 1, comprising:
selecting at least one image from each group for inclusion in the set of selected images.

9. Method according to claim 1, comprising:
selecting no more than a maximum number of images from a group.

10. Method according to claim 1, comprising:
ordering images within all of the groups based on image quality.

11. Method according to claim 1, wherein the ordering includes:
assigning a quality number to each image within at least one of the groups.

12. Method according to claim 11, comprising:
assigning a quality number to all images which are to be ordered.

13. Method according to claim 1, wherein the image quality is determined using at least one of image focus, image lighting characteristics, and image color.

14. Method according to claim 1, wherein the clustering is performed using at least one of a timestamp and a geophysical stamp associated with an image.

15. Method according to claim 1, comprising:
establishing a display time for each selected image as a function of image quality.

16. Method according to claim 1, wherein the set of selected images are selected from among a random group of images identified by a user and/or photograph manager in a processor.

17. Method according to claim 1, wherein the ordering includes establishing a scalable list of the images.

18. System for automatically selecting images, from among multiple images, for sequential display, comprising:
a memory for storing multiple images; and
a processor for automatically clustering images into groups, for ordering the images based on image quality, for selecting at least one of the images within a group based on a function of a characteristic of the image quality divided by a value which is a function of a percentage of images already selected from the group, and based on a total time established for a sequential display of a set of selected images, and for storing in the memory an indication of each image contained within the set of selected images.

19. System according to claim 18, comprising:
a user interface for establishing the total time for the sequential display of the set of selected images.

20. System according to claim 18, comprising:
a display for displaying the set of selected images, under control of the processor, within a specified sequence and within the total time.

21. System according to claim 18, wherein the selecting is performed based also on a function of a characteristic of a group.

22. System according to claim 18, wherein the selecting is performed based also on a function of a characteristic representing a temporal extent of a group, and a function of a number of images already selected from the group.

23. System according to claim 22, wherein the selecting is performed based also on dividing the temporal extent by a value which is a function of the number of images already selected from the group.

24. System according to claim 23, wherein the value which is a function of the number of images already selected from the group is determined as a relative coverage of images within the group, the relative coverage being determined as a function of a temporal characteristic of images already selected from the group, divided by a histogram of images contained within the time-based group.

25. System according to claim 18, wherein a display time with which each image will be displayed is stored in the memory.

26. System according to claim 18, wherein the processor continues the selecting until a total number N of images has been selected for inclusion within the set of selected images.

27. System according to claim 18, wherein the processor selects at least one image from each group for inclusion in the set of selected images.

28. System according to claim 18, wherein the processor orders images within all of the groups based on image quality.

29. System according to claim 18, wherein the processor assigns a quality number to each image within each of the groups.

30. System according to claim 18, wherein the image quality is determined using at least one of image focus, image lighting characteristics, and image color.

31. System according to claim 18, wherein the clustering is performed using at least one of a timestamp and a geophysical stamp associated with an images.

32. Method for automatically selecting images, from among multiple images, for sequential display, comprising:
establishing a total time for a sequential display of a set of selected images;
clustering images into groups;
ordering the images based on image quality; and
selecting at least one image within a group for inclusion in the set of selected images based on the image quality of the image, the total time, a function representing a temporal extent of a group, a number of images already selected from the group, and a division of a value which is a function of the temporal extent by a value which is a function of the number of images already selected from the group.

33. System for automatically selecting images, from among multiple images, for sequential display, comprising:
a memory for storing multiple images; and
a processor for automatically clustering images into groups, for ordering the images based on image quality, for selecting at least one of the images within a group based on the image quality and a total time established for a sequential display of a set of selected images, and for storing in the memory an indication of each image contained within the set of selected images, wherein the selecting is also based on a function representing a temporal extent of a group, a function of a number of images already selected from the group, and a division of a value which is a function of the temporal extent by a value which is a function of the number of images already selected from the group.

* * * * *